May 20, 1930.   C. W. WERST   1,759,675
LOCOMOTIVE FRAME
Filed April 12, 1929   5 Sheets-Sheet 3

Inventor:
Charles W. Werst.
by his Attorneys
Howson & Howson

May 20, 1930.  C. W. WERST  1,759,675
LOCOMOTIVE FRAME
Filed April 12, 1929   5 Sheets-Sheet 4

Inventor:
Charles W. Werst.
by his Attorneys

May 20, 1930.  C. W. WERST  1,759,675
LOCOMOTIVE FRAME
Filed April 12, 1929     5 Sheets-Sheet 5

Inventor:-
Charles W. Werst,
by his Attorneys
Howson & Howson

Patented May 20, 1930

1,759,675

UNITED STATES PATENT OFFICE

CHARLES W. WERST, OF PHILADELPHIA, PENNSYLVANIA

LOCOMOTIVE FRAME

Application filed April 12, 1929. Serial No. 354,629.

The object of my invention is to make a locomotive frame in a number of parts which are welded together so as to form a unitary structure. This object I attain in the following manner, reference being had to the accompanying drawings, in which:

Figs. 1ª and 1ᵇ are plan views of a locomotive frame made in accordance with my invention;

Figs. 2ª and 2ᵇ are side views of a locomotive frame illustrated in Figs. 1ª and 1ᵇ;

Figure 1:
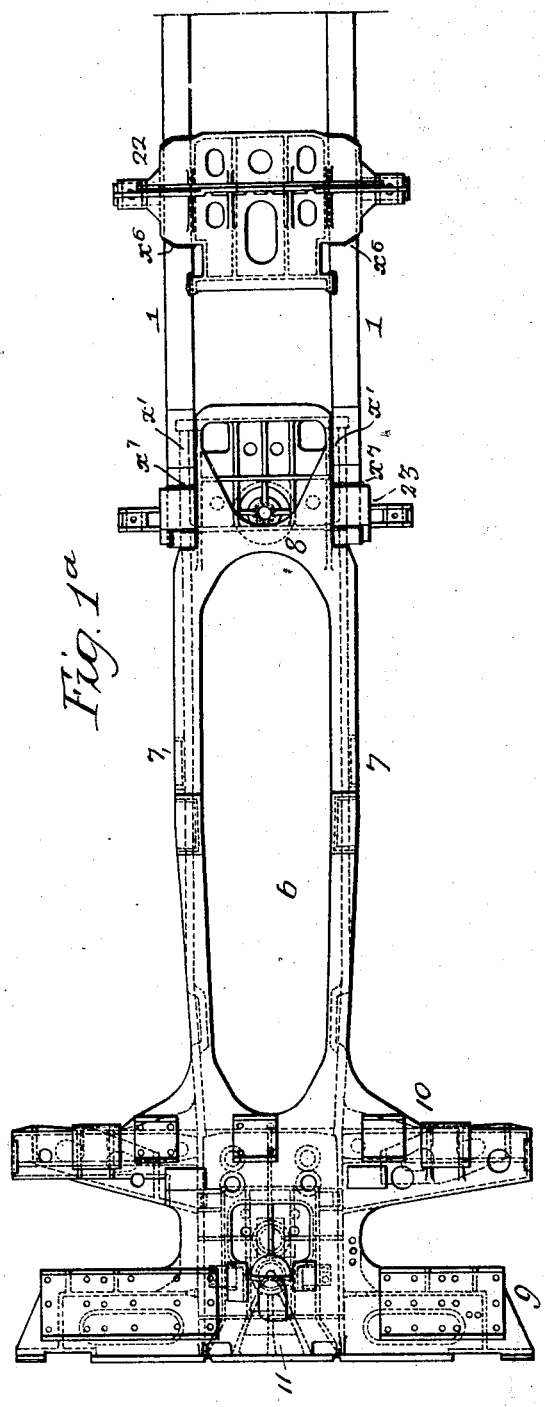
Figure 2:
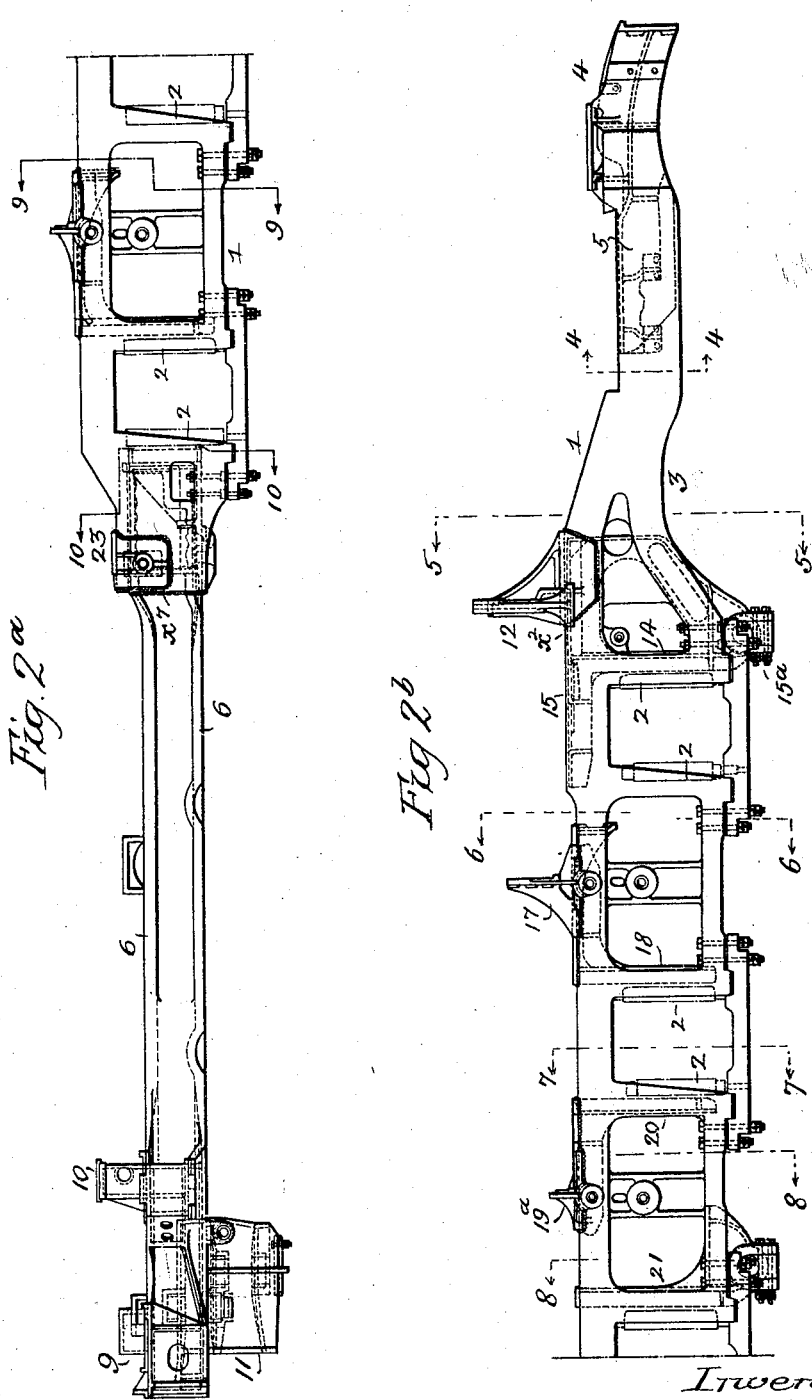
Figure 3:
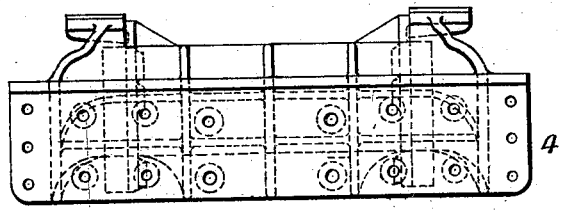
Fig. 3 is a front end view of the locomotive frame.
Figure 4:
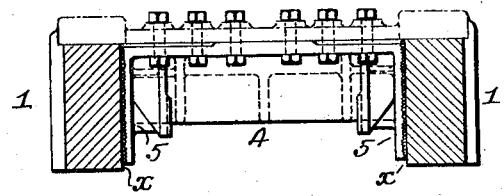
Fig. 4 is a transverse sectional view on the line 4—4, Fig. 2ᵇ.
Figure 5:
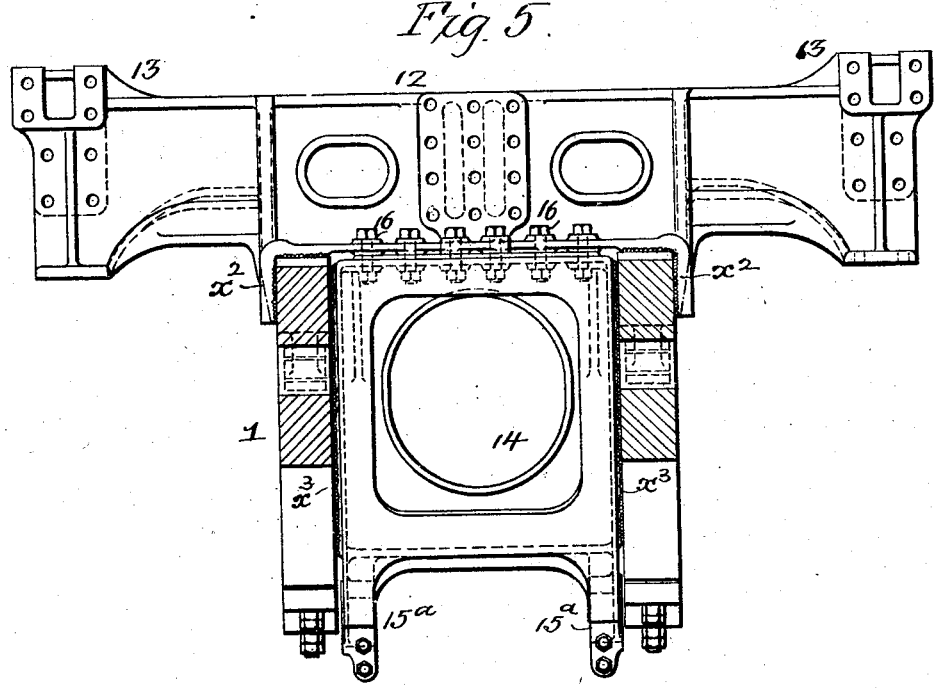
Fig. 5 is a transverse sectional view on the line 5—5, Fig. 2ᵇ.

Referring to the drawings, 1—1 are the main side frames which may be made in the conventional manner. In the present instance they are of a type known as bar frames. The side frames have pedestals 2 for the main axle boxes. The side frames are arched at 3 in the present instance and extend forward and abut shoulders on the front frame or foot plate 4. This front frame has rearwardly projecting portions 5 which extend between the side frames and are secured thereto by welding as shown at $x$.

The rear ends of the main side frames 1—1 are secured by welding as at $x'$ to the rear frame 6 which is shaped, in the present instance, as shown in Fig. 1ª, having side members 7 and a forward member 8 which connects the two side members and extends between the rear ends of the side frames and secured thereto as stated. At the rear end of the rear frame is the bumper structure 9 and the boiler support 10. Under the bumper is the coupling head 11 cast integral with the rear frame 6.

The main side frames 1—1 are connected together between the front and rear frames by a series of cross-ties. 12 is the guide bearer cross-tie. The guide bearer 13 may be made in any form desired and is secured to the side frames by welding as at $x^2$. Under the guide bearer cross-tie is a frame 14 which extends substantially the full depth of the side frames and has a horizontal section 15 which is located between the side frames 1—1. The frame 14 is welded to the side frames as at $x^3$ and is secured to the guide bearer by bolts 16 in the present instance. At the lower end of the frame 14 is the front brake shaft cross-tie 15ª.

Figure 6:
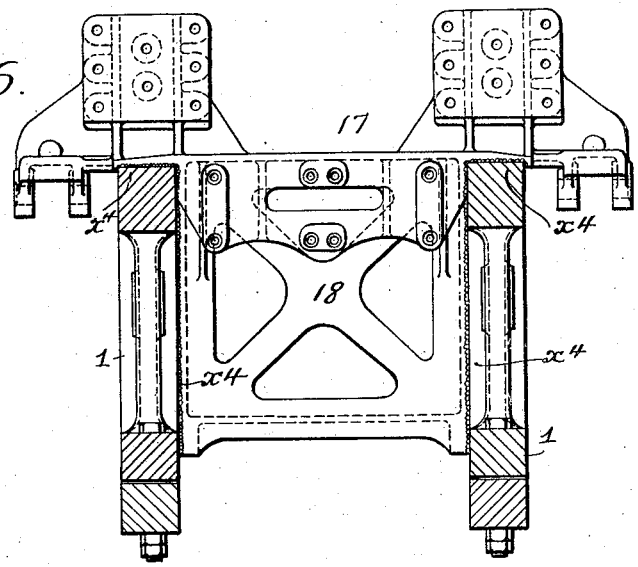
Fig. 6 is a transverse sectional view on the line 6—6, Fig. 2ᵇ.

17 is the valve motion cross-tie shaped as shown in Fig. 6 and extended to form a connecting frame 18. The cross-tie 17 and its frame 18 are welded to the side frames at $x^4$.

Figure 7:
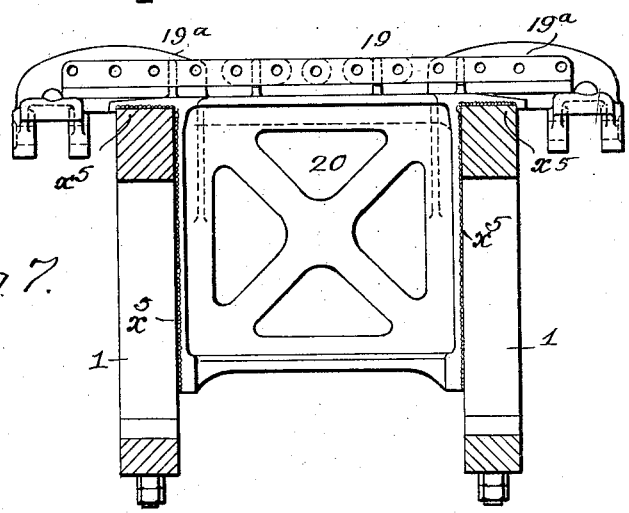
Fig. 7 is a transverse sectional view on the line 7—7, Fig. 2ᵇ.

The forward waist-sheet cross-tie 19 is shaped as shown in Fig. 7. The upper member 19ª of said cross-tie 19 rests upon the side frames 1—1 and the main portion 20 extends between the frames as shown. This cross-tie is welded to the frames at $x^5$.

Figure 8:
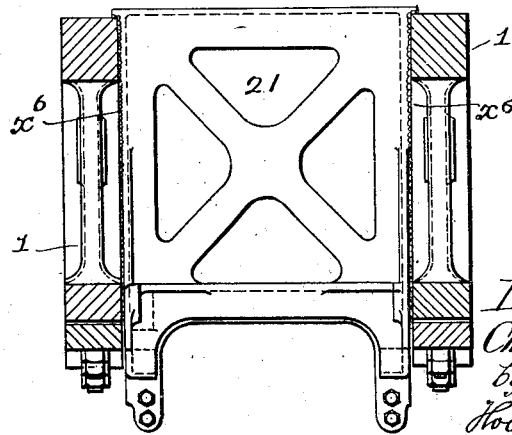
Fig. 8 is a transverse sectional view on the line 8—8, Fig. 2ᵇ.
Figure 9:
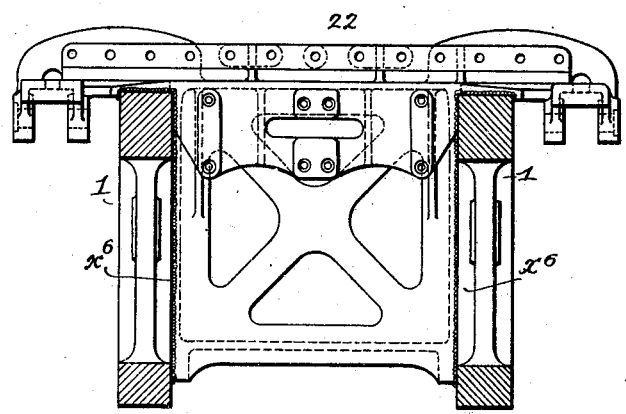
Fig. 9 is a transverse sectional view on the line 9—9, Fig. 2ª.

The back brake shaft cross-tie 21 is shaped as shown in Fig. 8 and fits between the side frames and is welded thereto at $x^6$.

The rear waist-sheet and back brake cylinder cross-tie 22 is made as shown in Figs. 1ª, 2ª and 9, and is welded to the side frames at $x^6$.

Figure 10:
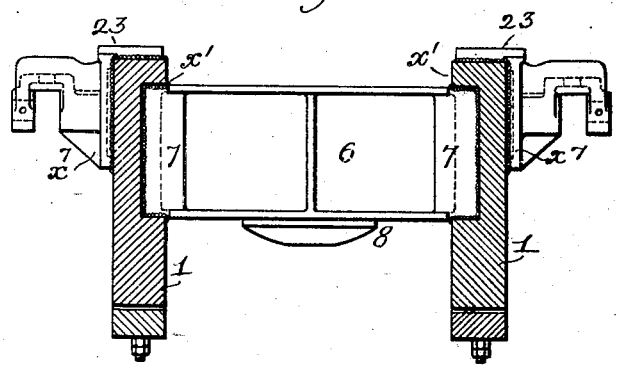
Fig. 10 is a transverse sectional view on the line 10—10, Fig. 2ª.

The furnace beam supports 23 are welded to the rear ends of the side frames at $x^7$ and are shaped as shown in Fig. 10.

It will be seen that by the above construction I am enabled to make the entire frame of the locomotive as a unitary structure, dispensing with bolts, rivets or other fastenings which tend to weaken the structure. The welding of the parts adds strength to the structure, and by making the parts in separate units and welding them together more accurate castings are obtained than where the entire structure is made in a single casting.

I claim:

1. The combination in a locomotive frame, of main side frames having pedestals for axle boxes; a front frame; a rear frame secured to the main side frames by welding; and a guide bearer cross-tie, a valve motion bearer cross-tie, and a waist-sheet and brake cylinder cross-tie located between and extending over the main side frames and welded to said side frames.

2. The combination in a locomotive frame, of main side frames; a rear frame having a portion extending between and welded to the said side frames; and a waist-sheet and brake cylinder cross-tie extending from one side frame to the other and over the projecting portion of the rear frame and welded to the side frames.

3. The combination in a locomotive frame, of two side frames; a front frame and a rear frame welded to said side frames; and a guide bearer cross-tie resting upon the side frames and welded thereto.

4. The combination in a locomotive frame, of two side frames; a front frame and a rear frame welded to said side frames; and a guide bearer cross-tie resting upon the side frames and welded thereto, the forward guide bearer cross-tie having a frame extending down between the two side frames and welded to said side frames and secured to the guide bearer cross-tie.

5. The combination in a locomotive frame, of two side frames; a front frame and a rear frame welded to said side frames; a valve motion bearer cross-tie resting upon the side frames and welded thereto; and a frame depending from said valve motion bearer cross-tie and fitting between the side frames and welded to said side frames.

6. The combination in a locomotive frame, of two side frames; a front frame and a rear frame welded to the side frames; and two waist-sheet bearer cross-ties resting upon the side frames and each having an extension fitting between the side frames, the edges of the said extensions being welded to the side frames.

7. The combination in a locomotive frame, of two side frames; a front frame and a rear frame; a series of cross-ties extending from one side frame to the other and welded to said side frames; and furnace bearing supports welded to the side frames at the point where the rear frame is welded to the side frames.

CHARLES W. WERST.